Figure 1:
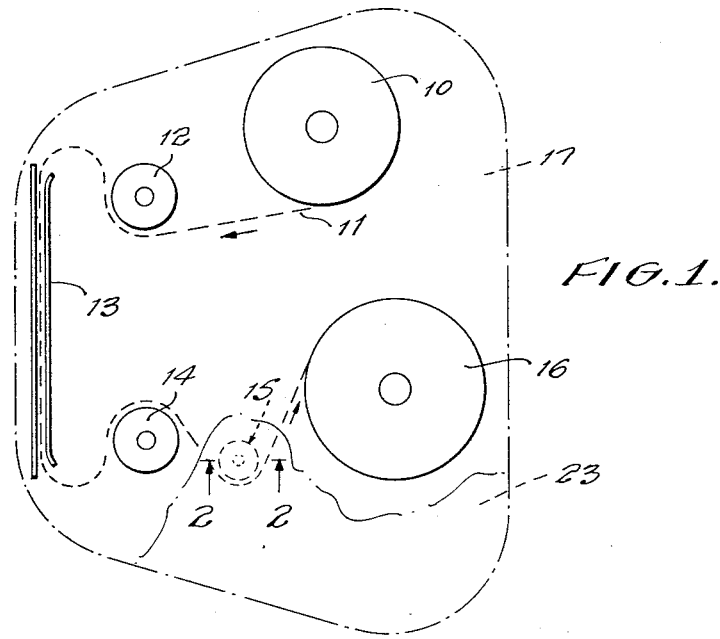

July 12, 1955  T. D. ALLEN, JR  2,713,158

FILM MOVEMENT INDICATOR

Filed June 27, 1951

INVENTOR.
Thomas D. Allen, Jr.
BY

United States Patent Office 2,713,158
Patented July 12, 1955

2,713,158

FILM MOVEMENT INDICATOR

Thomas D. Allen, Jr., Hartsdale, N. Y., assignor to Jacques Bolsey, New York, N. Y.

Application June 27, 1951, Serial No. 233,891

1 Claim. (Cl. 340—271)

The present invention relates to an indicator for use in motion picture cameras to indicate that there is moving film in the camera.

An object of the present invention is to provide an indicator of the above-described type which is of relatively simple construction and made of a small number of parts.

A further object of the present invention is to provide an indicator as described which is capable of being easily mounted on completed cameras, as well as during the construction of new cameras.

A still further object of the present invention is to provide an indicator of the above type which is capable of indicating film movement without permitting light to contact the film.

Another object of the present invention is to provide an indicator of the above type which requires no mechanical connection between the cover of the camera and the parts of the indicator located in the interior of the camera so that no centering means between the cover and the said parts of the indicator is required.

Still another object of the present invention is to provide an indicator of the above type which offers no mechanical resistance to its own functioning and to the progress of the film in the camera.

An additional object of the present invention is to provide an indicator of the above type which is capable of keeping the interior of the camera sealed from the outside so that no dirt or other foreign matter can enter into the interior of the camera.

With the above objects in view, my present invention mainly consists of a motion picture camera having an elongated member located in the path of film movement in the camera, the member being mounted for free rotation about the longitudinal axis thereof, a camera cover portion located over the elongated member, an indicator member mounted for rotation on the cover portion and being visible from outside the camera, the indicator member being operatively connected to the elongated member for movement therewith, whereby, when the elongated member is rotated by moving film the indicator member is also rotated so as to indicate to the operator that there is moving film in the camera.

A preferred embodiment of my present invention mainly consists of a motion picture camera having first and second wall portions located opposite to and apart from each other so as to provide a space therebetween, a stud fixedly mounted adjacent one end thereof to the first wall portion, the stud being located in the space and extending from the first wall portion towards the second wall portion, a roller of non-magnetic material mounted on the stud for free rotation thereabout and being located in the path of film movement in the space so that the roller may be moved by moving film which contacts the same, an opaque housing of non-magnetic material fixedly mounted on the second wall portion over the roller, the housing having an open end located on the outer side of the second wall portion and having a base portion located directly over the roller, the base portion being formed with a first opening extending into the same, an indicator disc of non-magnetic material located in the housing on the opposite side of the base portion thereof from the roller, an elongated pin member fixedly mounted in the disc and extending through the same so that opposite end portions of the pin member extend from opposite sides of the disc, one of the end portions of the pin member being located in the first opening for free rotation therein, and a transparent plate member fixedly mounted in the open end of the housing over the disc and being formed with a second opening extending into the same, the other end portion of the pin member being located in the second opening for free rotation therein, a first Alnico permanent magnet ring embedded in the roller member and having an outer face portion located adjcent to the base portion of the housing, a second Alnico permanent magnet ring embedded in the disc and having an outer face portion located adjacent to the base portion of the housing, the first and second permanent magnet rings being of the same diameter and being coaxially mounted with respect to each other, whereby, when the roller is rotated by moving film the indicator disc is rotated with the same and is visible through the transparent plate to indicate to the operator that there is moving film in the camera.

Figure 2:
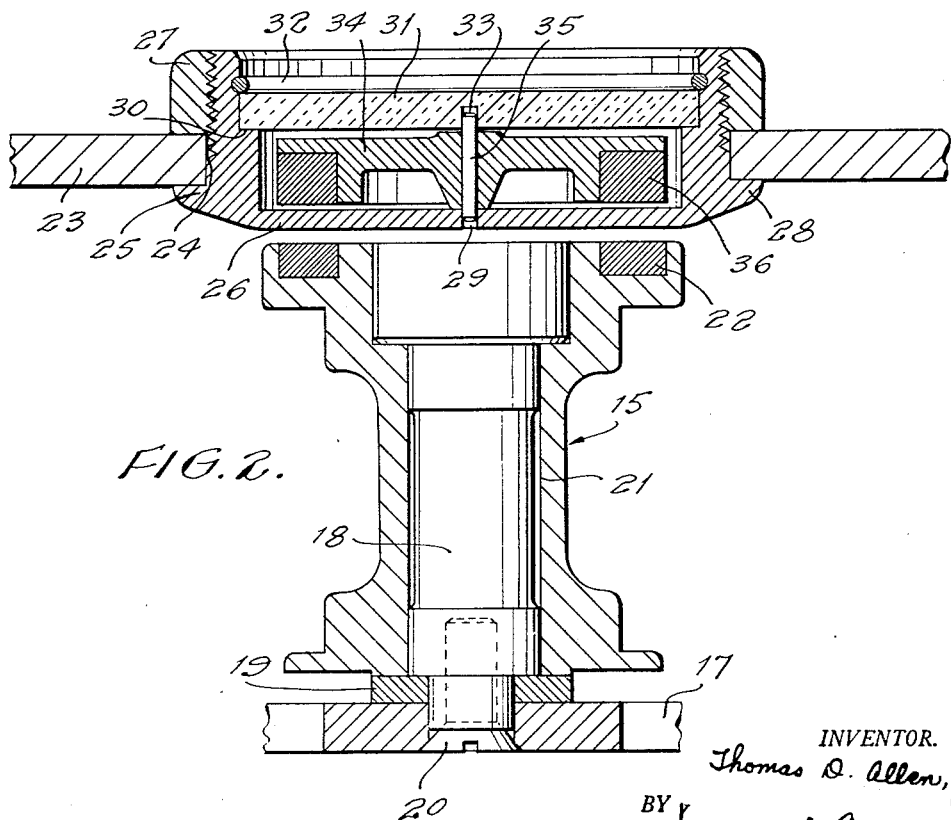

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the accompanying drawings, in which:

Fig. 1 is a schematic view diagrammatically illustrating the path of film movement in the camera; and Fig. 2 is a fragmentary, sectional, elevation view, taken along line 2—2 of Fig. 1, showing the details of the present invention.

Referring to the drawings, Fig. 1 shows the supply reel 10 from which the film 11 moves in the direction of the arrow to the sprocket 12, through the film gate means 13, to the take-up sprocket 14, then around the roller 15 and finally to the take-up reel 16.

In Fig. 2 there are shown the details of the construction and mounting of the roller 15 and the indicator structure associated therewith. The roller 15 is provided with a central outer portion located between opposite end flanges of the roller and adapted to be contacted by the moving film 11. To the lower wall portion 17 of the camera housing, fragmentarily shown in Fig. 2, there is fixedly connected the stud 18 and the washer 19 located between the stud 18 and the wall portion 17. Stud 18 may be fixedly mounted by any suitable means such as the screw 20 which threadedly engages the stud 18. The stud 18 is provided at opposite ends of its shank with bearing portions which engage the inner cylindrical opening 21 extending longitudinally of roller 15 so that the latter is mounted for free rotation on the stud 18. As is shown in Fig. 2, the roller member 15 is provided with an upper opening of a larger diameter than opening 21, and the head of stud 18 is located in this larger opening so that the roller 15 is substantially prevented from moving away from wall portion 17.

Roller 15 is preferably made of a non-magnetic material and has embedded in the upper portion thereof, as viewed in Fig. 2, a ring 22 which may be a permanent magnet made of Alnico and which has an upper exposed face.

The wall portion 23 of the camera is located opposite to and spaced from the wall portion 17 and has an opening 24 passing therethrough and located over roller 15.

Located in the opening 24 is the housing 25 which has a base portion 26 located directly over roller 15 and which has an open end located on the outer side of wall portion 23. Housing 25 is opaque and is preferably, though not necessarily, made of a non-magnetic material. The housing 25 is provided with a threaded outer portion engaged by the locking ring 27 which cooperates with the annular flange 28 of housing 25 to fixedly mount the latter on the periphery of opening 24, so as to completely fill the latter. Base portion 26 of housing 25 is formed with a central opening 29 extending therethrough and located in alignment with the axis of rotation of roller 15.

Housing 25 is provided in the interior thereof with an annular shoulder 30 upon which is located a transparent plate member 31 which may be made of transparent glass or any suitable transparent plastic material. Transparent plate member 31 is maintained in position on shoulder 30 by means of resilient ring 32, for example, which may be snapped into position in an annular groove formed in the interior of housing 25. Transparent plate member 31 is formed with an opening 33 extending into the same from the inner surface thereof and being located in alignment with the axis of rotation of roller 15. Openings 29 and 33 are of the same diameter.

An indicator member in the form of disc 34 is located in the space between base portion 26 of housing 25 and transparent plate member 31. Disc 34 is formed with a central opening extending therethrough and pin member 35 is fixedly mounted in this opening by means of a press fit, for example. Pin member 35 has opposite end portions which respectively extend from opposite sides of disc 34 and which are respectively located in the openings 29 and 33 for free rotation therein, and in this way disc 34 is also mounted for free rotation with pin member 35. Disc 34 is provided with a pair of relatively small central projecting portions which respectively project by slight distances from the opposite sides of disc 34 so as to prevent these sides from respectively contacting the base portion 26 of housing 25 and the transparent plate member 31.

Disc 34 is preferably made of a non-magnetic material and has embedded therein a permanent Alnico magnet ring 36 which has an exposed lower face located adjacent to base portion 26 of housing 25. On the upper face of disc 34, which is located adjacent to transparent plate 31, various color designs may be placed so as to make the movement of disc 34 easily visible through transparent plate member 31.

Although rings 36 and 22 have been described as both being permanent Alnico magnets, these rings may also take the form of permanent ferrous magnets, and it is also possible for only one of these rings to be a permanent magnet and the other one simply to be made of a magnetic material.

The operation of the device is obvious. As the film 11 moves along its path it is in contact with the roller 15 and rotates the same, and since the rings 36 and 22 are located within each other's magnetic field the disc 34 is rotated with the roller 15 so as to give an indication through the transparent plate 31 that there is moving film in the camera.

It will be understood that each of the elements described above, or two or more together, may also find a useful application in other types of telltale assemblies differing from the types described above.

While the invention has been illustrated and described as embodied in magnetic telltale assembly for indicating film movement in a motion picture camera, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

In a motion picture camera, in combination, first and second wall portions located opposite to and apart from each other so as to provide a space therebetween; a stud fixedly mounted adjacent one end thereof to said first wall portion, said stud being located in said space and extending from said first wall portion towards said second wall portion; a roller of non-magnetic material mounted on said stud for free rotation thereabout and being located in the path of film movement in said space so that said roller may be moved by moving film which contacts the same; an opaque housing of non-magnetic material fixedly mounted on said second wall portion over said roller, said housing having an open end located on the outer side of said second wall portion and having a base portion located directly over said roller, said base portion being formed with a first opening extending into the same; an indicator disc of non-magnetic material located in said housing on the opposite side of said base portion thereof from said roller; an elongated pin member fixedly mounted in said disc and extending through the same so that opposite end portions of said pin member extend from opposite sides of said disc, one of said end portions of said pin member being located in said first opening for free rotation therein; a transparent plate member fixedly mounted in said open end of said housing over said disc and being formed with a second opening extending into the same, the other end portion of said pin member being located in said second opening for free rotation therein; a first Alnico permanent magnet ring embedded in said roller member and having an outer face portion located adjacent to said base portion of said housing; and a second Alnico permanent magnet ring embedded in said disc and having an outer face portion located adjacent to said base portion of said housing, said first and second permanent magnet rings being of the same diameter and being coaxially mounted with respect to each other, whereby, when said roller is rotated by moving film said indicator disc is rotated with the same and is visible through said transparent plate to indicate to the operator that there is moving film in the camera.

References Cited in the file of this patent

UNITED STATES PATENTS

| | | |
|---|---|---|
| 280,322 | Nash | June 26, 1883 |
| 957,082 | Nash | May 3, 1910 |
| 1,033,610 | Nash | July 23, 1912 |
| 2,441,185 | Brown et al. | May 11, 1948 |